July 6, 1937.   C. POTTER   2,086,432
TWIN DRIVE DIFFERENTIAL
Filed March 11, 1936   2 Sheets-Sheet 1
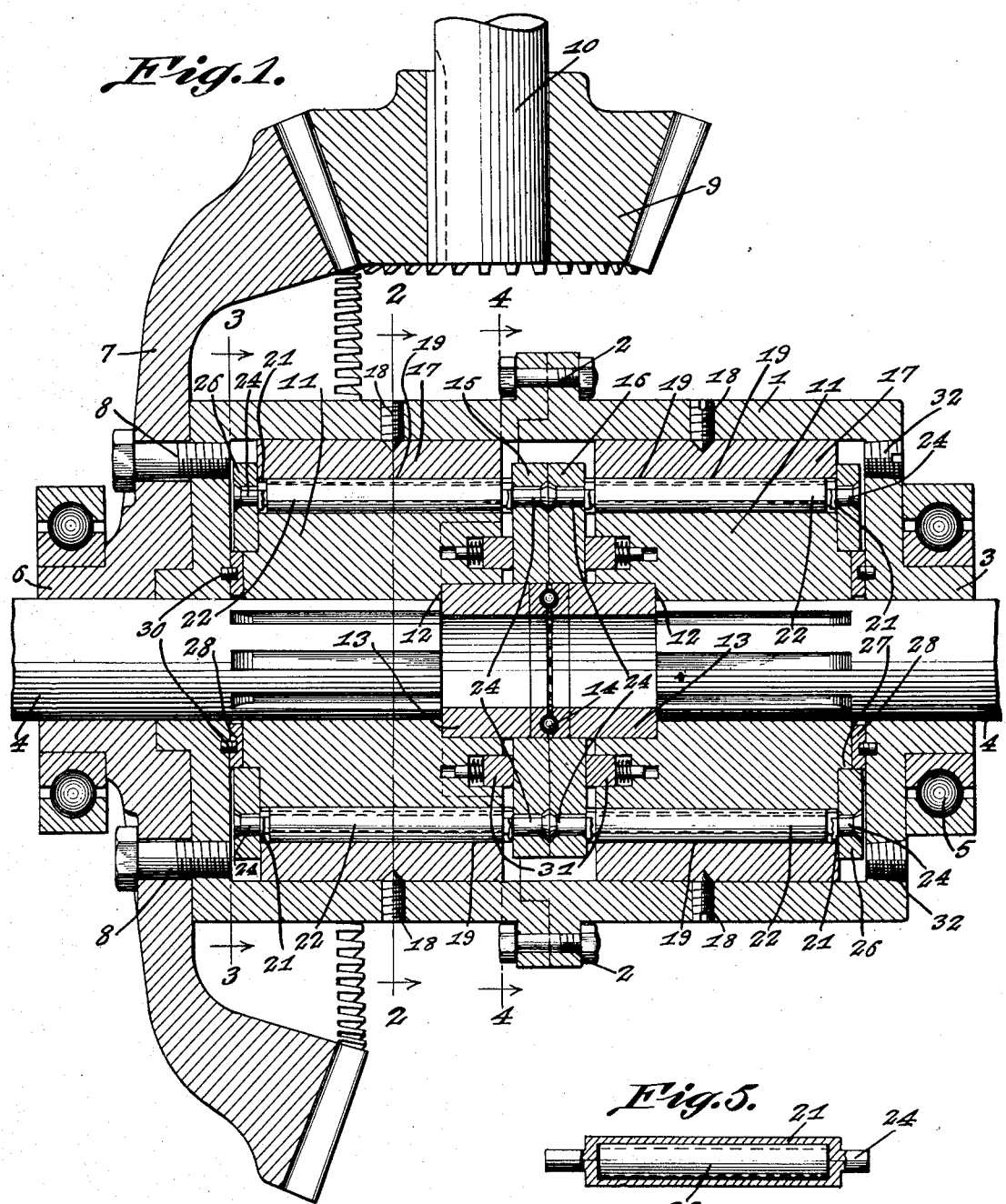
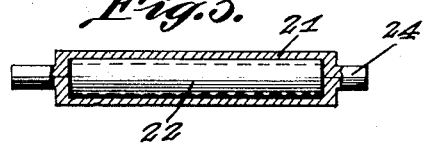
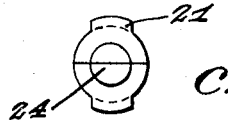
Charles Potter, INVENTOR
BY Victor J. Evans & Co.
ATTORNEY July 6, 1937.  C. POTTER  2,086,432
TWIN DRIVE DIFFERENTIAL
Filed March 11, 1936  2 Sheets-Sheet 2
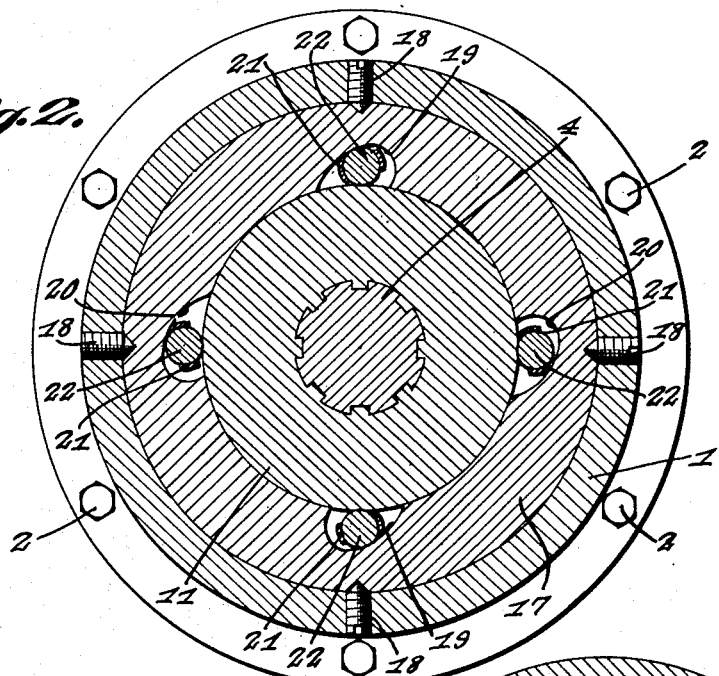
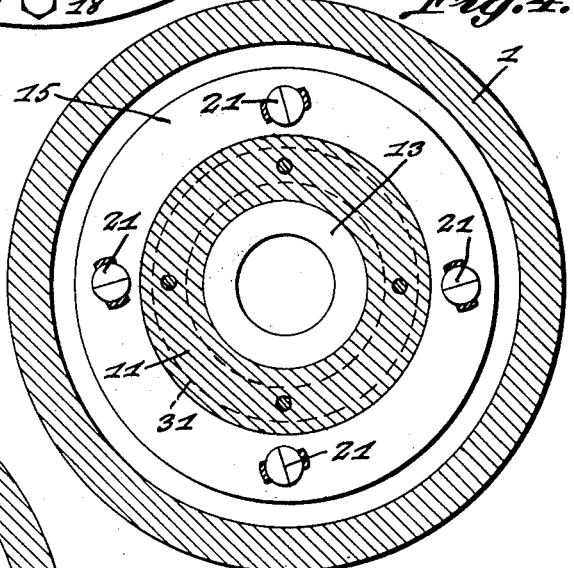
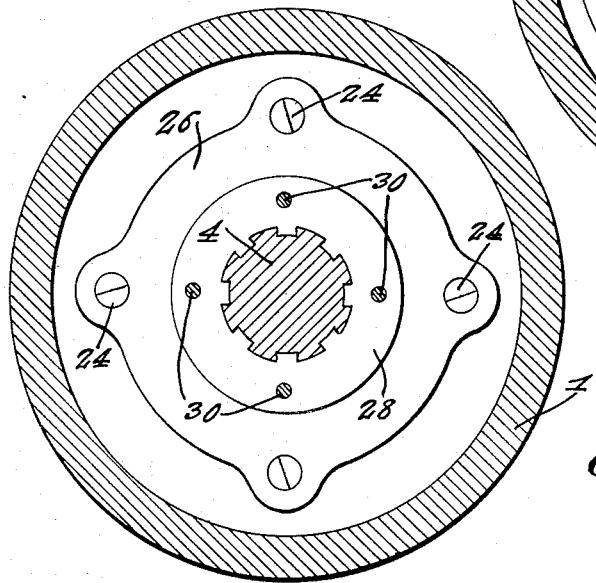
Charles Potter, INVENTOR
BY Victor J. Evans & Co.
ATTORNEY Patented July 6, 1937

2,086,432

UNITED STATES PATENT OFFICE 2,086,432

TWIN DRIVE DIFFERENTIAL

Charles Potter, Halstead, Kans.

Application March 11, 1936, Serial No. 68,307

2 Claims. (Cl. 74—389.5)

This invention relates to differential for motor vehicles and like devices and has for the primary object the provision of a device of this character which will deliver power to both vehicle wheels which are connected to the differential when both wheels obtain the same traction and to deliver power to the wheel which is obtaining traction when the other wheel fails in obtaining traction and to permit either of said wheels to rotate faster than the other and to deliver power to the wheel which is rotating slower.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary sectional view illustrating a differential constructed in accordance with my invention.

Figure 2 is a transverse sectional view taken on the line 2—2 of Figure 1.

Figure 3 is a transverse sectional view taken on the line 3—3 of Figure 1.

Figure 4 is a transverse sectional view taken on the line 4—4 of Figure 1.

Figure 5 is a detail sectional view illustrating one of the rollers and its mounting.

Figure 6 is an end view illustrating the mounting for the roller.

Referring in detail to the drawings, the numeral 1 indicates a cylindrical casing constructed of companion sections detachably connected by bolts or similar fasteners 2. The end walls of the casing are in the form of journals 3 to receive wheel axles 4 of a motor vehicle. The casing 1 is mountable in the conventional type of differential housing (not shown) and is rotatably supported by anti-friction bearings 5, one of which is interposed between one of the journals 3 and the differential housing (not shown) and the other between the hub 6 of a ring gear 7 and the differential housing. The ring gear 7 is detachably secured to one end of the casing by stud bolts 8 and meshes with a drive pinion 9 secured to a propeller shaft 10.

Drums 11 are splined or otherwise secured to the inner ends of the axles 4 and are spaced from the walls of the casing 1 and also from each other. The opposing ends of the drums are recessed, as shown at 12, to receive spacing sleeves 13. The spacing sleeves are separated by a thrust bearing 14 and also abut the inner ends of the axles 4. The spacing sleeves 13 project out of the seats 12 and cooperate in forming a journal for friction discs 15 and 16.

Drive sleeves 17 have a frictional fit with the casing 1 and are secured thereto by stud bolts 18. The drive sleeves surround the drums 11 and each have formed therein pairs of tapered grooves 19 and 20. The grooves 19 are reversely arranged to the grooves 20 and the grooves of each pair are oppositely opposed. Extending into the pairs of grooves are roller mountings 21 in which are journaled rollers 22. The periphery of the rollers contact with the peripheries of the drums and walls of the grooves 19 and 20. Each roller mounting 21 is in the form of a split sleeve having pintles 24 at the ends thereof. The roller mountings project out of the grooves 19 and the pintles thereof are journaled to the friction discs 15 and 16 and cage rings 26. The cage rings and friction discs support the roller mountings. The rings 26 are mounted on shouldered portions 27 of the hubs 11 and interposed between the shouldered portions 27 and the end walls of the casing 1 are wear rings 28, said wear rings being suitably secured to the end walls, as shown at 30. The axles 4 pass through the wear rings.

Friction rings 31 are yieldably supported between the friction discs 15 and 16 and the adjacent ends of the drums.

One end of the casing 1 has openings normally closed by removable plugs 32. The openings normally closed by the plugs 32 and the openings which receive the stud bolts 8 are employed to admit a suitable instrument into the casing when it is desired to remove the drive sleeves therefrom and after the separation of the sections of the casing.

In operation, the drive from the propeller shaft 10 to the drive sleeves 17 is through the drive pinion 9, ring gear 7 and casing 1. The drive sleeves, drums 11 and rollers cooperate in forming overrunning clutches between the casing 1 and the axles 4. Due to the arrangement of the rollers, grooves and friction discs 15 and 16 each drive sleeve and drum produces a pair of overrunning clutches, one reverse in operation to the other so that the axles 4 may be driven in either direction by the propeller shaft depending in which direction the propeller shaft is rotated. When power is delivered to the differential for rotating the axles 4 to propel the vehicles forwardly the grooves 19 and the rollers thereof act to establish a drive between said sleeves and drums while the rollers in the grooves 20 are free or do not wedge between the walls of the grooves 20 and the drums. However, on a reverse drive to the differential from the propeller shaft, the grooves 20 and their rollers act to drive the drums by the sleeves, while the rollers of the grooves 19 are held against becoming wedged between the walls of said grooves 19 and the drums by the drag developed by the friction discs 15 and 16. Therefore, it will be seen that the rollers of the grooves 19 act to drive the axles in a direction to propel the vehicle forwardly while the rollers and the grooves 20 act to propel the vehicle in a reverse direction. The arrangement of the rollers and grooves between the drive sleeves and drums will permit either of the wheels of the vehicle to turn faster than the other. When either of the drums turns faster than its respective drive sleeve and in the same direction may turn free thereof due to the arrangement of the rollers and their grooves or the overrunning clutches provided thereby. Consequently, a vehicle when traveling upon a turn, the wheel on the outside of the turn may travel faster than the wheel on the inside of the turn, while the wheel on the inside of the turn is having power delivered thereto. This also applies should one of the wheels lose traction, the wheel which has traction will receive power, consequently permitting the vehicle to more readily extract itself from a stalled position and also will aid in preventing a vehicle from stalling.

Having described the invention, I claim:

1. A differential comprising a casing adapted for journaling in a differential housing, means for delivering power to said casing for rotating the latter in either direction, axles extending into said casing and rotatably supported thereby, thrust means between said axles, drums secured to said axles, sleeves surrounding said drums and secured to the casing and having grooves provided with tapered walls, rollers operating in the grooves and cooperating with the walls thereof and the peripheries of the drums in forming overrunning clutches, certain of said clutches acting to rotate the axles in one direction from the casing and the other clutches acting to drive the axles in a reverse direction by said casing, cages for supporting said rollers and including friction discs contacting each other and journaled on said thrust means for rendering the clutches operative and inoperative, and friction rings bearing against said friction discs and yieldably secured to the drums.

2. A differential comprising a casing adapted for journaling in a differential housing, means for delivering power to said casing for rotating the latter in either direction, axles extending into said casing and rotatably supported thereby, thrust means between said axles, drums secured to said axles, sleeves surrounding said drums and secured to the casing and having grooves provided with tapered walls, rollers operating in the grooves and cooperating with the walls thereof and the peripheries of the drums in forming overrunning clutches, certain of said clutches acting to rotate the axles in one direction from the casing and the other clutches acting to drive the axles in a reverse direction by said casing, split sleeves located in the grooves of the drive sleeve to form journals for the rollers, cages supporting said split sleeves and including contacting friction discs supported by the thrust means, and friction rings engaging the friction discs and yieldably secured to the drums.

CHARLES POTTER.